US012633447B2

(12) United States Patent
Chien et al.

(10) Patent No.: US 12,633,447 B2
(45) Date of Patent: May 19, 2026

(54) COIL MODULE

(71) Applicant: TDK TAIWAN CORP., Taoyuan City (TW)

(72) Inventors: Feng-Lung Chien, Taoyuan City (TW); Chien-Hung Lin, Taoyuan City (TW); Kuang-Lun Lee, Taoyuan City (TW); Wei-Chun Li, Taoyuan City (TW)

(73) Assignee: TDK TAIWAN CORP., Taoyuan City (TW)

( * ) Notice: Subject to any disclaimer, the term of this patent is extended or adjusted under 35 U.S.C. 154(b) by 1100 days.

(21) Appl. No.: 17/492,053

(22) Filed: Oct. 1, 2021

(65) Prior Publication Data

US 2022/0277886 A1 Sep. 1, 2022

(30) Foreign Application Priority Data

Feb. 26, 2021 (CN) ......................... 202120432037.7

(51) Int. Cl.
*H01F 27/28* (2006.01)
*H01F 41/04* (2006.01)

(52) U.S. Cl.
CPC ......... *H01F 27/2871* (2013.01); *H01F 41/04* (2013.01)

(58) Field of Classification Search
CPC .... H01F 27/2871; H01F 41/04; H01F 27/366; H01F 38/14
USPC ............................ 336/84 M, 84 R, 200, 232
See application file for complete search history.

(56) References Cited

U.S. PATENT DOCUMENTS

2014/0239892 A1* 8/2014 Sawa ...................... H02J 50/12 320/108
2020/0350113 A1* 11/2020 Chien ..................... H01F 38/14

FOREIGN PATENT DOCUMENTS

CN 103915681 A * 7/2014

* cited by examiner

*Primary Examiner* — Tuyen T Nguyen
(74) *Attorney, Agent, or Firm* — MUNCY, GEISSLER, OLDS & LOWE, P.C.

(57) ABSTRACT

A coil module includes a coil assembly, a first induction substrate, a second induction substrate and an adhesive element. The coil assembly has a winding axis. The coil assembly is disposed on the first induction substrate. The first induction substrate is disposed on the second induction substrate. The adhesive element covers the first induction substrate and the second induction substrate, and the adhesive element has a first adhesive portion and a second adhesive portion. When viewed in a direction perpendicular to the winding axis, the first adhesive portion and the second adhesive portion are located on different planes.

20 Claims, 6 Drawing Sheets

COIL MODULE

CROSS REFERENCE TO RELATED APPLICATIONS

This application claims the benefit of China Patent Application No. 202120432037.7, filed on Feb. 26, 2021, the entirety of which is incorporated by reference herein.

BACKGROUND OF THE DISCLOSURE

Field of the Disclosure

The present disclosure relates to a coil module, and more particularly to a coil module applied to wireless communication or wireless charging.

Description of the Related Art

As technology has progressed, many kinds of electronic devices such as tablet computers and smartphones have begun to include the functionality of wireless charging. A user can place the electronic device on a wireless charging transmitting terminal so that the wireless charging receiving terminal in the electronic device generates current by electromagnetic induction or electromagnetic resonance to charge the battery. Due to the convenience of wireless charging, electronic devices equipped with wireless charging modules have gradually become popular.

In general, the wireless charging module includes a magnetically conductive substrate to support a coil. When the coil is provided with electricity to operate in a wireless charging mode or a wireless communication mode, the magnetically conductive substrate can concentrate the magnetic lines of force emitted from the coil for better performance. However, the existing structure of the wireless charging (or communication) module and the existing way of winding the coil do not meet the various requirements for coil modules, such as better charging performance, better communication performance, and less thickness.

Therefore, how to design a coil module capable of fulfilling the user's various needs is a topic nowadays that needs to be discussed and solved.

BRIEF SUMMARY OF THE DISCLOSURE

Accordingly, one objective of the present disclosure is to provide a coil module to solve the above problems.

According to some embodiments of the disclosure, a coil module includes a coil assembly, a first induction substrate, a second induction substrate and an adhesive element. The coil assembly has a winding axis. The coil assembly is disposed on the first induction substrate. The first induction substrate is disposed on the second induction substrate. The adhesive element covers the first induction substrate and the second induction substrate, and the adhesive element has a first adhesive portion and a second adhesive portion. When viewed in a direction perpendicular to the winding axis, the first adhesive portion and the second adhesive portion are located on different planes.

According to some embodiments, the first induction substrate has a plurality of first cracks, the second induction substrate has a plurality of second cracks, and the first cracks and the second cracks face different directions.

According to some embodiments, the coil module further includes a first adhesive assembly and a protection element, and the first adhesive assembly is disposed between the second induction substrate and the protection element, wherein the adhesive element is in contact with the first cracks, and the first adhesive assembly is in contact with the second cracks.

According to some embodiments, the coil module defines a first axis and a second axis, the first axis is perpendicular to the second axis, the first induction substrate has a first accommodating recess, and the first accommodating recess is formed along the first axis.

According to some embodiments, the adhesive element has a second accommodating recess formed along the first axis, and when viewed along the winding axis, the first accommodating recess overlaps at least a part of the second accommodating recess.

According to some embodiments, the coil module further includes a first adhesive assembly, a second adhesive assembly, and a protection element, the first adhesive assembly is disposed between the second induction substrate and the protection element, the second adhesive assembly is disposed between the first induction substrate and the second induction substrate, wherein when viewed in the direction of the winding axis, the maximum size of the first induction substrate is smaller than the maximum size of the second induction substrate.

According to some embodiments, when viewed along the second axis, the maximum thickness of the first induction substrate is greater than the maximum thickness of the second induction substrate.

According to some embodiments, when viewed in the direction of the winding axis, the maximum length of the first accommodating recess in the first axis is shorter than the maximum length of the second accommodating recess in the first axis.

According to some embodiments, when viewed in the direction of the winding axis, a width of the first accommodating recess in the second axis is greater than a width of the second accommodating recess in the second axis.

According to some embodiments, the coil assembly includes a main body, a first leading wire and a second leading wire, the first leading wire and the second leading wire are connected to the main body, and when viewed along the first axis, the first leading wire and the second leading wire are located on different planes.

According to some embodiments, when viewed along the first axis, the diameter of the first leading wire is less than the height of the first accommodating recess along the winding axis.

According to some embodiments, when viewed along the winding axis, the main body has two straight portions and two bending portions, these straight portions are connected to these bending portions, and the main body has an oval structure.

According to some embodiments, when viewed along the winding axis, there is a distance between the main body and the second induction substrate along the first axis, there is a second distance between the main body and the second induction substrate along the second axis, and the first distance is greater than the second distance.

According to some embodiments, when viewed along the first axis, a part of the first leading wire overlaps the first accommodating recess, and a part of the first leading wire overlaps the second accommodating recess.

According to some embodiments, the coil module further includes a third adhesive assembly disposed between the coil assembly and the adhesive element, and the shape of the third adhesive assembly corresponds to the shape of the coil assembly.

According to some embodiments, when viewed in the direction of the winding axis, the center of the third adhesive assembly is the same as the center of the coil assembly.

According to some embodiments, a slit is formed on the third adhesive assembly, and when viewed along the second axis, the slit overlaps at least a part of the first leading wire.

According to some embodiments, the coil assembly, the third adhesive assembly, the adhesive element, the first induction substrate, the second adhesive assembly, the second induction substrate, the first adhesive assembly, and the protection element are arranged along the winding axis in sequence.

According to some embodiments, when viewed in another direction perpendicular to the winding axis, at least a part of the adhesive element overlaps the first induction substrate, and the adhesive element overlaps the second induction substrate.

According to some embodiments, the adhesive element further has a middle portion which is connected between the first adhesive portion and the second adhesive portion, and the middle portion is in contact with the sidewall of the first induction substrate.

The present disclosure provides a coil module for transmitting energy or signals, including at least one coil assembly and at least one induction substrate. The induction substrate is disposed adjacent to the coil assembly. The induction substrate is configured to change the electromagnetic field distribution near the coil assembly so that the electromagnetic waves of the coil assembly are more concentrated. The design of the coil module of the present disclosure can improve mechanical strength, usage efficiency, charging efficiency, heat dissipation efficiency, and achieve overall miniaturization and overall weight reduction, and reduce electromagnetic interference.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
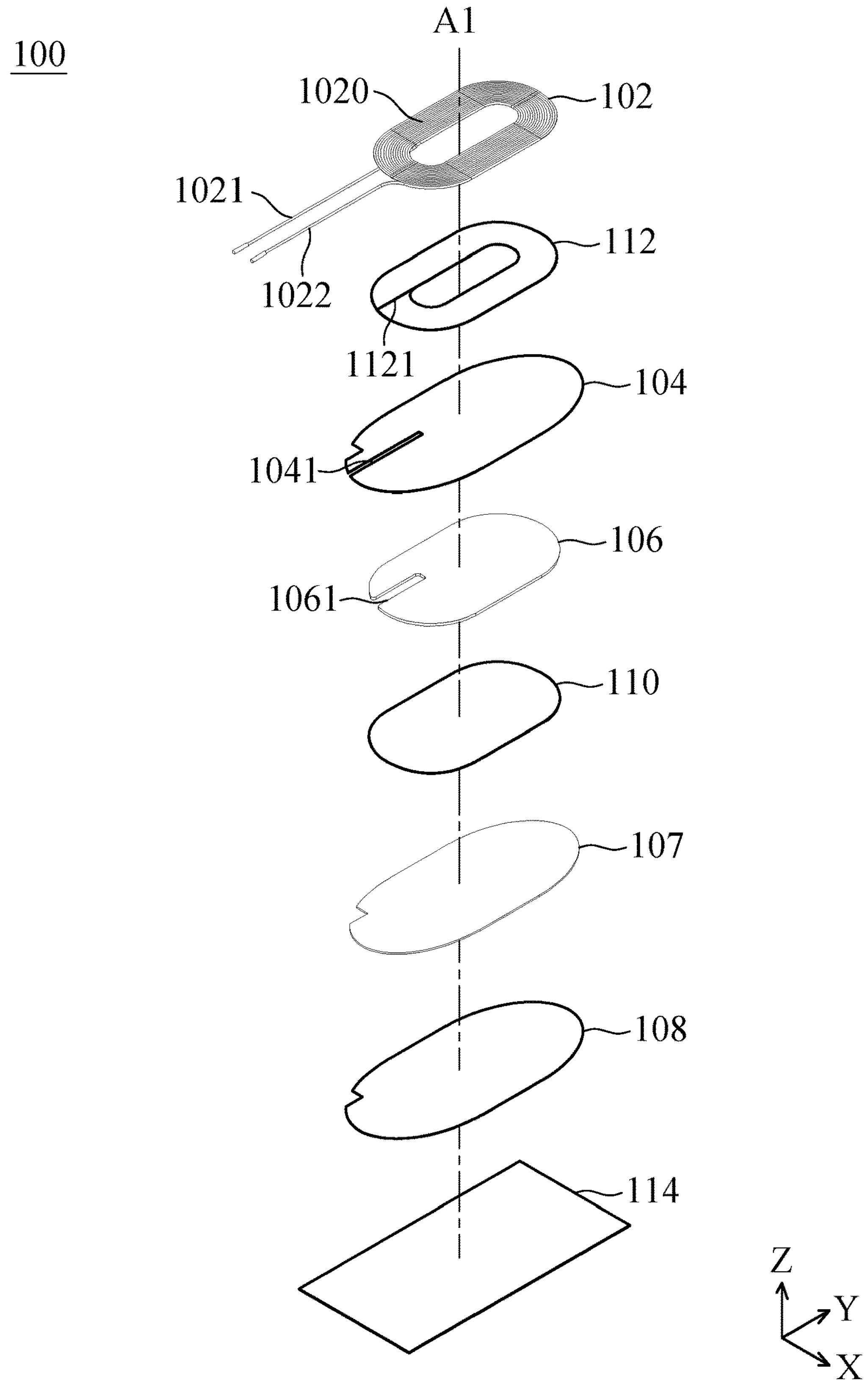
FIG. 1 is an exploded diagram of a coil module 100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that component for specific description or specific figures can be present in any form with which a skilled person is familiar. In addition, when a layer is "above" other layers or a substrate, it might be "directly" on the layers or the substrate, or some other layers may be between the layer and the other layers.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is an exploded diagram of a coil module 100 according to an embodiment of the present disclosure. As shown in FIG. 1, the coil module 100 is a coil module that can be used to transmit energy or signals. The coil module 100 may include a coil assembly 102, an adhesive element 104, a first adhesive assembly 108, a second adhesive assembly 110, a third adhesive assembly 112, a first induction substrate 106, a second induction substrate 107 and a protection element 114.

In this embodiment, the coil assembly 102, the third adhesive assembly 112, the adhesive element 104, the first induction substrate 106, the second adhesive assembly 110, the second induction substrate 107, the first adhesive assembly 108, and the protection element 114 are arranged in sequence in a first direction A1. The first direction A1 may be the extension direction of the winding axis of the coil assembly 102.

In this embodiment, the coil assembly 102 can serve as a charging coil to be wireless charged by an external charging device. For example, the coil assembly 102 can operate as a resonant charging coil based on the standard of the Alliance for Wireless Power (A4WP), but it is not limited thereto. In addition, the coil assembly 102 can operate as an inductive charging coil based on the standard of Wireless Power Consortium (WPC), such as the Qi standard. Therefore, the coil assembly 102 can respond to different forms of charging so as to enlarge the range of applications in this embodiment. For example, in the case of a close distance (for example, 1 cm or less), the inductive type operation is used; and at a long distance, a resonance type operation is used.

In this embodiment, the coil assembly 102 can also be used as a communication coil, for example, operating in Near Field Communication (NFC) mode to communicate with external electronic devices.

In this embodiment, the first induction substrate 106 and/or the second induction substrate 107 are disposed adjacent to the coil assembly 102, and the first induction substrate 106 and/or the second induction substrate 107 are configured to change the electromagnetic field distribution near the coil assembly 102. The first induction substrate 106 and/or the second induction substrate 107 may be a magnetic body, such as a ferrite, but it is not limited thereto. For example, in other embodiments, the first induction substrate 106 and/or the second induction substrate 107 may also include a nanocrystalline material. The first induction substrate 106 and the second induction substrate 107 may each have a magnetic permeability corresponding to the coil assembly 102, so that the electromagnetic waves of the coil assembly 102 can be more concentrated.

The adhesive element 104, the first adhesive assembly 108, the second adhesive assembly 110, and the third adhesive assembly 112 may be double-sided adhesive tape or single-sided adhesive tape to adhere to one or two adjacent elements. In some embodiments, one or more of the adhesive element 104, the first adhesive assembly 108, the second adhesive assembly 110, and the third adhesive assembly 112 may be made of polyethylene terephthalate (PET), but it is not limited to this. The protection element 114 can be used to protect the coil module 100 and is removed when the coil module 100 is installed in an electronic device (not shown).

Figure 2:
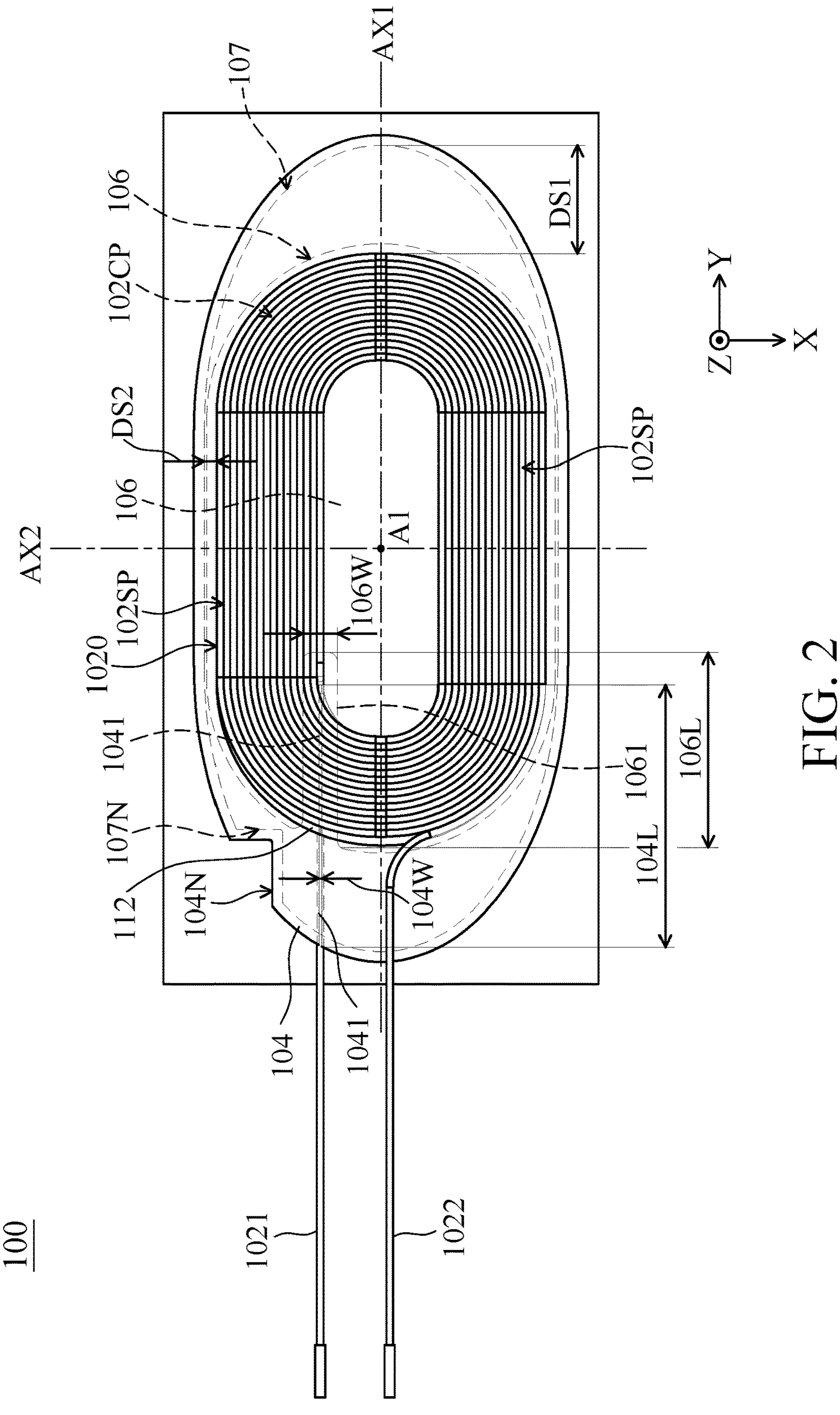
FIG. 2 is a top view of the coil module 100 after being assembled according to an embodiment of the present disclosure.
Figure 3:
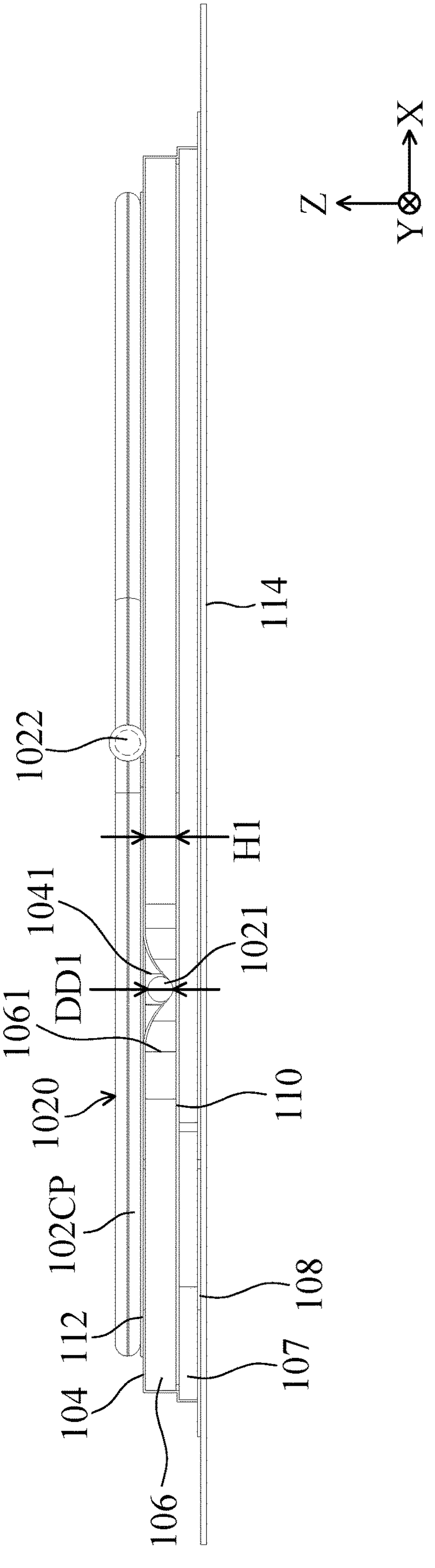
FIG. 3 is a diagram of the coil module 100 after being assembled when viewed along the Y-axis according to an embodiment of the present disclosure.

Please refer to FIG. 1 to FIG. 3 together. FIG. 2 is a top view of the coil module 100 after being assembled according to an embodiment of the present disclosure, and FIG. 3 is a diagram of the coil module 100 after being assembled when viewed along the Y-axis according to an embodiment of the present disclosure. As shown in FIG. 1 and FIG. 2, the coil module 100 defines a first axis AX1 and a second axis AX2, and the first axis AX1 is perpendicular to the second axis AX2. For example, the first axis AX1 is parallel to the Y-axis, the second axis AX2 is parallel to the X-axis, and the first axis AX1, the second axis AX2, and the first direction A1 are perpendicular to each other.

As shown in FIG. 1, the first induction substrate 106 has a first accommodating recess 1061, and the first accommodating recess 1061 is formed along the first axis AX1 (the Y-axis).

Furthermore, the adhesive element 104 has a second accommodating recess 1041 formed along the first axis AX1, and when viewed in the first direction A1 (the direction of the winding axis), the first accommodating recess 1061 overlaps at least a part of the second accommodating recess 1041.

Specifically, as shown in FIG. 2, when viewed in the first direction A1 (the direction of the winding axis), the maximum length 106L of the first accommodating recess 1061 in the first axis AX1 is shorter than the maximum length 104L of the second accommodating recess 1041 in the first axis AX1.

In addition, when viewed in the first direction A1 (the direction of the winding axis), the width 106W of the first accommodating recess 1061 in the second axis AX2 is greater than the width 104W of the second accommodating recess 1041 in the second axis AX2.

As shown in FIG. 1, the first adhesive assembly 108 is disposed between the second induction substrate 107 and the protection element 114, and the second adhesive assembly 110 is disposed between the first induction substrate 106 and the second induction substrate 107, so that the first induction substrate 106 is connected to the second induction substrate 107. When viewed in the first direction A1 (the direction of the winding axis), as shown in FIG. 2, the maximum size of the first induction substrate 106 is smaller than the maximum size of the second induction substrate 107.

In this embodiment, as shown in FIG. 1, the coil assembly 102 has a main body 1020, a first leading wire 1021 and a second leading wire 1022. The first leading wire 1021 and the second leading wire 1022 are connected to the main body 1020, and the first leading wire 1021 is substantially parallel to the second leading wire 1022.

In addition, as shown in FIG. 2, when viewed in the first direction A1 (the direction of the winding axis), the main body 1020 has two straight portions 102SP and two bending portions 102CP, these straight portions 102SP are connected to these bending portions 102CP, and the main body 1020 may have an oval structure.

Specifically, as shown in FIG. 2, when viewed in the first direction A1 (the direction of the winding axis), there is a distance DS1 between the main body 1020 and the second induction substrate 107 along the first axis AX1, there is a second distance DS2 between the main body 1020 and the second induction substrate 107 along the second axis AX2, and the first distance DS1 is greater than the second distance DS2.

It is worth noting that, as shown in FIG. 2, the adhesive element 104 has a first notch 104N, and the second induction substrate 107 has a second notch 107N. The shape of the first notch 104N corresponds to the shape of the second notch 107N. The first notch 104N and the second notch 107N can serve as a positioning structure, so that the coil module 100 can be positioned accurately. In other embodiments, the adhesive element 104 and the second induction substrate 107 may not have the aforementioned first notch 104N and second notch 107N.

Please continue to refer to FIG. 1 and FIG. 2. In this embodiment, the third adhesive assembly 112 is disposed between the coil assembly 102 and the adhesive element 104, so that the coil assembly 102 is fixedly connected to the adhesive element 104. Specifically, the shape of the third adhesive assembly 112 corresponds to the shape of the main body 1020 of the coil assembly 102, such as an ellipse.

In this embodiment, a slit 1121 is formed on the third adhesive assembly 112 so that the first leading wire 1021 can pass through the slit 1121 and be accommodated in the first accommodating recess 1061 and the second accommodating recess 1041.

In this embodiment, when viewed in the first direction A1 (the direction of the winding axis), the center of the third adhesive assembly 112 is the same as the center of the coil assembly 102 to ensure the connecting strength between the coil assembly 102 and the adhesive element 104. In addition, the size of the third adhesive assembly 112 is greater than or equal to the size of the main body 1020, but it is not limited to this, and can be adjusted according to practical needs.

Please refer to FIG. 3, when viewed along the first axis AX1 (the Y-axis), the distance between the first leading wire 1021 and the second induction substrate 107 along the Z-axis is less than the distance between the second leading wire 1022 and the second induction substrate 107 along the Z-axis. That is, the first leading wire 1021 and the second leading wire 1022 are located on different planes.

In addition, when viewed along the first axis AX1, a part of the first leading wire 1021 overlaps the first accommodating recess 1061, and a part of the first leading wire 1021 overlaps the second accommodating recess 1041.

Furthermore, when viewed along the first axis AX1, the diameter DD1 of the first leading wire 1021 is less than the height H1 of the first accommodating recess 1061 along the winding axis (the Z-axis). Based on the above structural design, when the first leading wire 1021 is disposed in the first accommodating recess 1061, the first leading wire 1021 does not push the bending portion 102CP of the main body 1020, so that all the wires of the main body 1020 are on the same plane, and therefore the purpose of miniaturization can be effectively achieved.

It is worth noting that when viewed along the first axis AX1, the adhesive element 104 overlaps at least a part of the first accommodating recess 1061, and when viewed along the second axis AX2, the adhesive element 104 also overlaps at least a part of the first accommodating recess 1061. That is, a part of adhesive element 104 is located in the first accommodating recess 1061.

Figure 4:
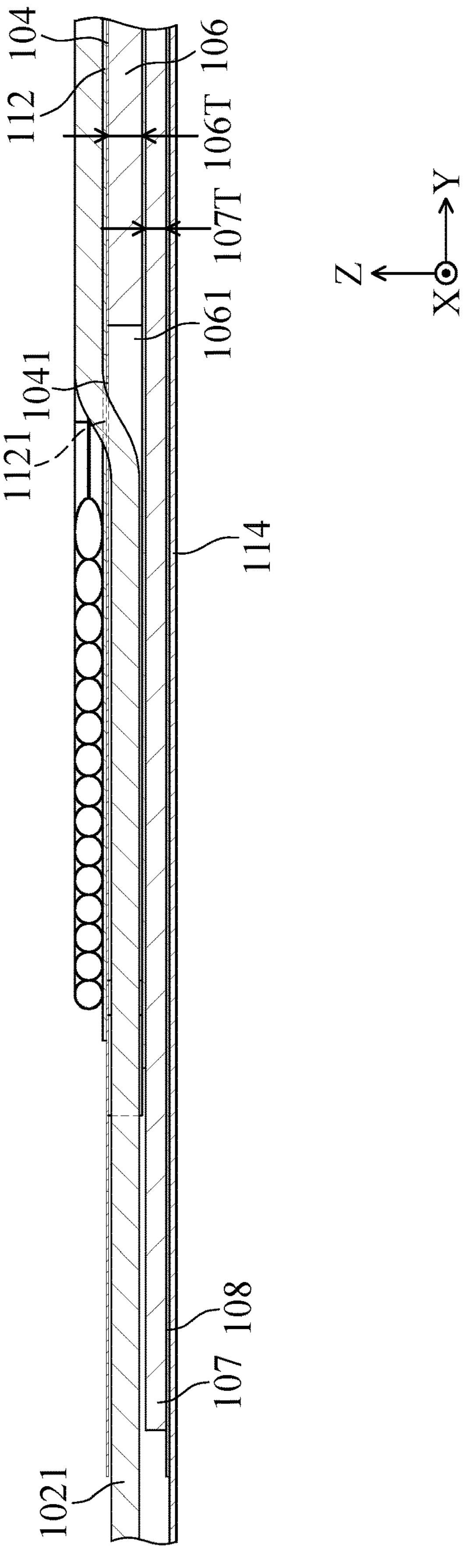
FIG. 4 is a cross-sectional view of the coil module 100 when viewed along the X-axis according to an embodiment of the present disclosure.

Please refer to FIG. 4, which is a cross-sectional view of the coil module 100 when viewed along the X-axis according to an embodiment of the present disclosure. When viewed along the second axis AX2 (the X-axis), the maximum thickness 106T of the first induction substrate 106 is greater than the maximum thickness 107T of the second induction substrate 107.

As shown in FIG. 4, when viewed along the second axis AX2, a part of the first leading wire 1021 overlaps the first accommodating recess 1061, a part of the first leading wire 1021 overlaps the second accommodating recess 1041, and the slit 1121 overlaps at least a part of the first leading wire 1021.

Figure 6:
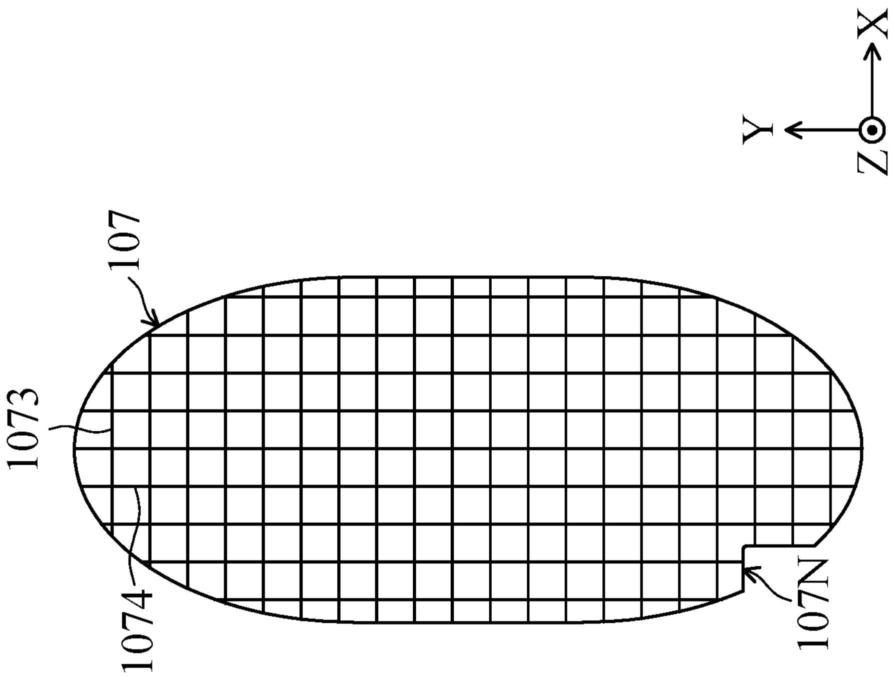
FIG. 6 is a top view of the second induction substrate 107 according to an embodiment of the present disclosure.
Figure 5:
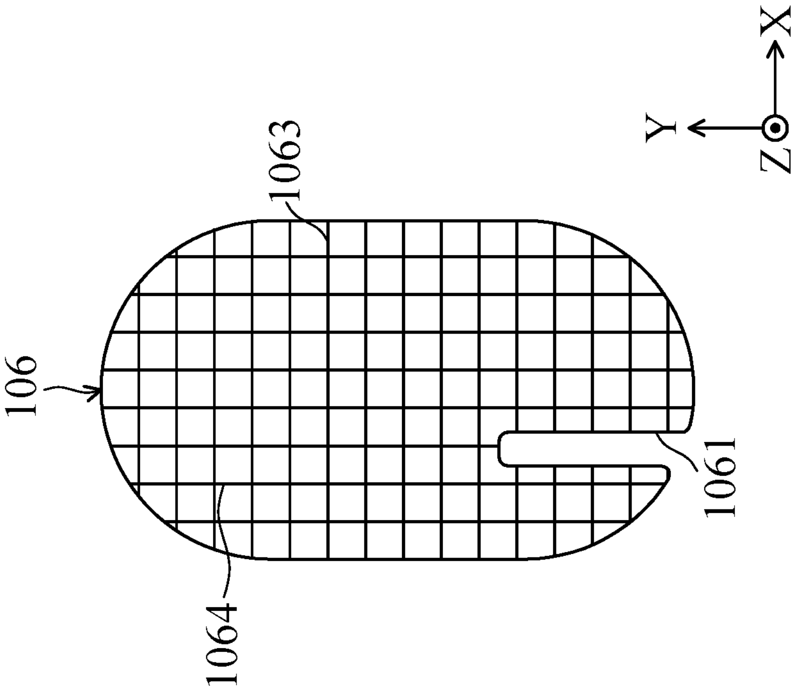
FIG. 5 is a top view of the first induction substrate 106 according to an embodiment of the present disclosure.

Please refer to FIG. 5 and FIG. 6. FIG. 5 is a top view of the first induction substrate 106 according to an embodiment of the present disclosure, and FIG. 6 is a top view of the second induction substrate 107 according to an embodiment of the present disclosure. In this embodiment, when viewed in the direction of the winding axis, the first induction substrate 106 has a plurality of first cracks 1063 and 1064 intersecting each other, and the first crack 1063 is substantially perpendicular to the first crack 1064. Similarly, as shown in FIG. 6, the second induction substrate 107 also has a plurality of second cracks 1073 and 1074, and the arrangement of the second cracks 1073 and 1074 is similar to that of the first cracks 1063 and 1064.

Figure 7:
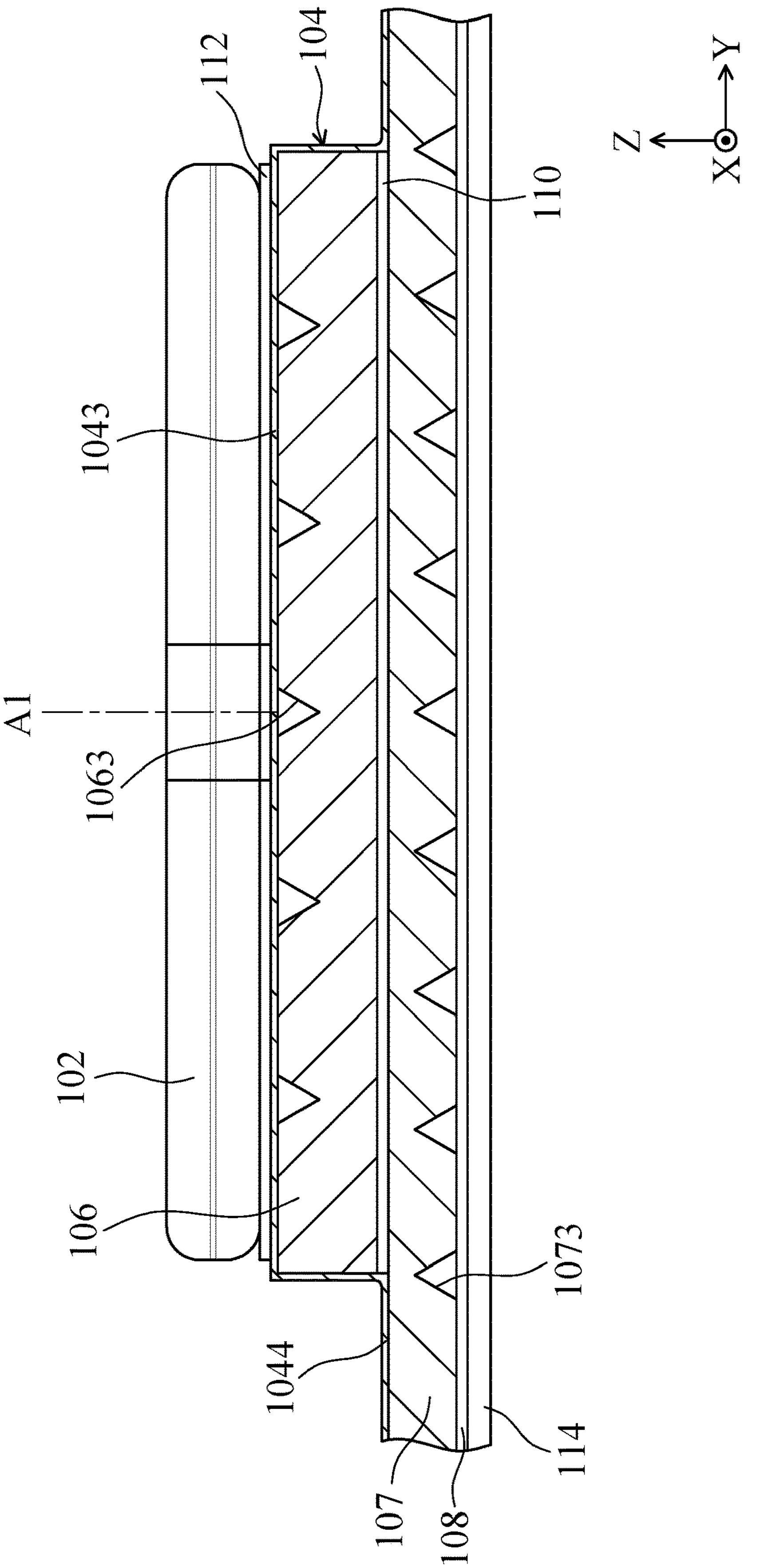
FIG. 7 is an enlarged cross-sectional view of FIG. 2 according to an embodiment of the present disclosure.

Please refer to FIG. 5 to FIG. 7. FIG. 7 is an enlarged cross-sectional view of FIG. 2 according to an embodiment of the present disclosure. As shown in FIG. 7, the coil assembly 102 is disposed on the first induction substrate 106, and the first induction substrate 106 is disposed on the second induction substrate 107. The adhesive element 104 covers the first induction substrate 106 and the second induction substrate 107, and the adhesive element 104 has a first adhesive portion 1043 and a second adhesive portion 1044.

When viewed along a direction perpendicular to the first direction A1 (the direction of the winding axis), for example, viewed along the second axis AX2, the first adhesive portion 1043 and the second adhesive portion 1044 are located on different planes. Furthermore, as shown in FIG. 7, when viewed along the first axis AX1, at least a part of the adhesive element 104 overlaps the first induction substrate 106. In addition, as shown in FIG. 3, the adhesive element 104 also overlaps the second induction substrate 107.

It is worth noting that, as shown in FIG. 7, the first cracks 1063 and the second cracks 1073 face different directions. Specifically, the first cracks 1063 face the +Z-direction, and the second cracks 1073 face the −Z-direction.

In addition, the first adhesive assembly 108 is disposed between the second induction substrate 107 and the protection element 114, the adhesive element 104 is in contact with the first cracks 1063, and the first adhesive assembly 108 is in contact with the second cracks 1073. Based on the above structural design, not only can the demand for miniaturization be achieved, but also the transmission efficiency of the coil module 100 can be increased.

The present disclosure provides a coil module for transmitting energy or signals, including at least one coil assembly and at least one induction substrate. The induction substrate is disposed adjacent to the coil assembly. The induction substrate is configured to change the electromagnetic field distribution near the coil assembly so that the electromagnetic waves of the coil assembly are more concentrated. The design of the coil module of the present disclosure can improve mechanical strength, usage efficiency, charging efficiency, heat dissipation efficiency, and achieve overall miniaturization and overall weight reduction, and reduce electromagnetic interference.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A coil module for transmitting energy or signals, comprising:

a coil assembly, having a winding axis;

a first induction substrate, wherein the coil assembly is disposed on the first induction substrate;

a second induction substrate, wherein the first induction substrate is disposed on the second induction substrate; and an adhesive element, covering the first induction substrate and the second induction substrate, and the adhesive element having a first adhesive portion and a second adhesive portion;

wherein when viewed in a direction perpendicular to the winding axis, the first adhesive portion is in direct contact with the first induction substrate, and the second adhesive portion is in direct contact with the second induction substrate;

wherein when viewed along the winding axis, the first adhesive portion covers a first area of the first induction substrate, the second adhesive portion covers a second area of the second induction substrate; and wherein when viewed along the winding axis, the first area does not overlap with the second area, and the second area encloses the first area.

2. The coil module as claimed in claim 1, wherein the first induction substrate has a plurality of first cracks, the second induction substrate has a plurality of second cracks, and the first cracks and the second cracks face different directions.

3. The coil module as claimed in claim 2, wherein the coil module further includes a first adhesive assembly and a protection element, and the first adhesive assembly is disposed between the second induction substrate and the protection element, wherein the adhesive element is in contact with the first cracks, and the first adhesive assembly is in contact with the second cracks.

4. The coil module as claimed in claim 1, wherein the coil module defines a first axis and a second axis, the first axis is perpendicular to the second axis, the first induction substrate has a first accommodating recess, and the first accommodating recess is formed along the first axis.

5. The coil module as claimed in claim 4, wherein the adhesive element has a second accommodating recess formed along the first axis, and when viewed along the winding axis, the first accommodating recess overlaps at least a part of the second accommodating recess.

6. The coil module as claimed in claim 5, wherein the coil module further includes a first adhesive assembly, a second adhesive assembly, and a protection element, the first adhesive assembly is disposed between the second induction substrate and the protection element, the second adhesive assembly is disposed between the first induction substrate and the second induction substrate, wherein when viewed in the direction of the winding axis, a maximum size of the first induction substrate is smaller than a maximum size of the second induction substrate.

7. The coil module as claimed in claim 6, wherein when viewed along the second axis, a maximum thickness of the first induction substrate is greater than a maximum thickness of the second induction substrate.

8. The coil module as claimed in claim 6, wherein when viewed in the direction of the winding axis, a maximum length of the first accommodating recess in the first axis is shorter than a maximum length of the second accommodating recess in the first axis.

9. The coil module as claimed in claim 8, wherein when viewed in the direction of the winding axis, a width of the first accommodating recess in the second axis is greater than a width of the second accommodating recess in the second axis.

10. The coil module as claimed in claim 9, wherein the coil assembly includes a main body, a first leading wire and a second leading wire, the first leading wire and the second leading wire are connected to the main body, and when viewed along the first axis, the first leading wire and the second leading wire are located on different planes.

11. The coil module as claimed in claim 10, wherein when viewed along the first axis, a diameter of the first leading wire is less than a height of the first accommodating recess along the winding axis.

12. The coil module as claimed in claim 10, wherein when viewed along the winding axis, the main body has two straight portions and two bending portions, these straight portions are connected to these bending portions, and the main body has an oval structure.

13. The coil module as claimed in claim 10, wherein when viewed along the winding axis, there is a distance between the main body and the second induction substrate along the first axis, there is a second distance between the main body and the second induction substrate along the second axis, and the first distance is greater than the second distance.

14. The coil module as claimed in claim 10, wherein when viewed along the first axis, a part of the first leading wire overlaps the first accommodating recess, and a part of the first leading wire overlaps the second accommodating recess.

15. The coil module as claimed in claim 10, wherein the coil module further includes a third adhesive assembly disposed between the coil assembly and the adhesive element, and a shape of the third adhesive assembly corresponds to a shape of the coil assembly.

16. The coil module as claimed in claim 15, wherein when viewed in the direction of the winding axis, a center of the third adhesive assembly is the same as a center of the coil assembly.

17. The coil module as claimed in claim 15, wherein a slit is formed on the third adhesive assembly, and when viewed along the second axis, the slit overlaps at least a part of the first leading wire.

18. The coil module as claimed in claim 17, wherein the coil assembly, the third adhesive assembly, the adhesive element, the first induction substrate, the second adhesive assembly, the second induction substrate, the first adhesive assembly, and the protection element are arranged along the winding axis in sequence.

19. The coil module as claimed in claim 1, wherein when viewed in another direction perpendicular to the winding axis, at least a part of the adhesive element overlaps the first induction substrate, and the adhesive element overlaps the second induction substrate.

20. The coil module as claimed in claim 1, wherein the adhesive element further has a middle portion which is connected between the first adhesive portion and the second adhesive portion, and the middle portion is in contact with a sidewall of the first induction substrate.

* * * * *